(12) United States Patent
Nagamitsu (10) Patent No.: US 11,995,437 B2
(45) Date of Patent: May 28, 2024

(54) CENTER, DISTRIBUTION CONTROL METHOD, AND NON-TRANSITORY STORAGE MEDIUM

(71) Applicant: TOYOTA JIDOSHA KABUSHIKI KAISHA, Toyota (JP)

(72) Inventor: Shoichi Nagamitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 17/679,165

(22) Filed: Feb. 24, 2022

(65) Prior Publication Data

US 2022/0318003 A1 Oct. 6, 2022

(30) Foreign Application Priority Data

Apr. 1, 2021 (JP) .................. 2021-063112

(51) Int. Cl.
*G06F 8/71* (2018.01)
*G06F 8/65* (2018.01)
*G07C 5/00* (2006.01)

(52) U.S. Cl.
CPC .................. *G06F 8/71* (2013.01); *G06F 8/65* (2013.01); *G07C 5/008* (2013.01)

(58) Field of Classification Search
CPC .............. G06F 8/71; G06F 8/65; G07C 5/008
USPC ....................................................... 717/122
See application file for complete search history.

(56) References Cited

U.S. PATENT DOCUMENTS

| | | | |
|---|---|---|---|
| 2004/0261071 A1* | 12/2004 | Chuang .................. | H04L 41/082 717/176 |
| 2015/0088370 A1* | 3/2015 | Vangelov ............. | G07C 5/0858 701/33.2 |
| 2021/0157529 A1 | 5/2021 | Sakurai et al. | |
| 2021/0157572 A1 | 5/2021 | Harata et al. | |
| 2021/0255805 A1* | 8/2021 | Harata .................. | H04L 12/403 |

FOREIGN PATENT DOCUMENTS

| | | |
|---|---|---|
| CN | 107436757 A | 12/2017 |
| CN | 112543915 A | 3/2021 |
| JP | 2018-181377 A | 11/2018 |
| JP | 2020-027620 A | 2/2020 |

OTHER PUBLICATIONS

Mbakoyiannis, "Secure Over-the-air Firmware Updating for Automotive Electronic Control Units", 2019, [Online], pp. 174-181, [Retrieved from internet on Jan. 2, 2024], <chrome-extension://efaidnbmnnnibpcajpcglclefindmkaj/https://dl.acm.org/doi/pdf/10.1145/3297280.3297299> (Year: 2019).*

* cited by examiner

*Primary Examiner* — S. Sough
*Assistant Examiner* — Zengpu Wei
(74) *Attorney, Agent, or Firm* — Oliff PLC (57) ABSTRACT

A center configured to communicate with a vehicle includes one or more processors. The processors are configured to store an update record of software of an electronic control unit mounted on the vehicle. The processors are configured to receive a current version of the software of the electronic control unit from the vehicle. The processors are configured to determine whether the received current version agrees with a version of a last update recorded in the update record. The processors are configured to transmit an error notification to the vehicle when the processors determine that the received current version does not agree with the version of the last update.

7 Claims, 8 Drawing Sheets

| NUMBER | DATE AND TIME OF UPDATE | ECU-A | ECU-B | ECU-C | ... |
|---|---|---|---|---|---|
| 1 | 20XX0201 18:15:04 | 1.0 | 1.0 | 1.0 | ... |
| 2 | 20XX0514 10:33:23 | 1.0 | 1.0 | 2.0 | ... |
| 3 | 20XX0731 14:47:58 | 2.0 | 2.0 | 3.0 | ... |

CENTER, DISTRIBUTION CONTROL METHOD, AND NON-TRANSITORY STORAGE MEDIUM

CROSS-REFERENCE TO RELATED APPLICATION

This application claims priority to Japanese Patent Application No. 2021-063112 filed on Apr. 1, 2021, incorporated herein by reference in its entirety.

BACKGROUND

1. Technical Field

The present disclosure relates to a center communicable with an over-the-air (OTA) master that controls software update of an electronic control unit mounted on a vehicle, and also relates to a distribution control method and a non-transitory storage medium.

2. Description of Related Art

Vehicles include a plurality of electronic control units (ECUs) configured to control operations of the vehicles. The electronic control unit includes a processor, a transitory storage such as a random-access memory (RAM), and a non-volatile storage such as a flash read-only memory (ROM). The processor implements control functions of the electronic control unit by executing software stored in the storage. The software stored in each electronic control unit is rewritable. Updating to a newer version of the software enables improvement in the functions of the electronic control unit and addition of new vehicle control functions.

An over-the-air (OTA) technology is known as a technology for updating software of electronic control units. In the OTA technology, an in-vehicle communication device connected to an in-vehicle network is wirelessly connected to a communication network such as the Internet. A device that handles a software update process for the vehicle downloads the software through wireless communication from a center having a server function, and installs the downloaded software in the electronic control unit. In this manner, the software of the electronic control unit is updated or added.

The software update process using the OTA technology can be started by an OTA master by transmitting version information of the software of the electronic control unit to the center (checking updates) via the in-vehicle communication device when power supply or ignition of the vehicle is ON (see, for example, Japanese Unexamined Patent Application Publication No. 2018-181377 (JP 2018-181377 A)). The OTA master is the device that handles the software update process for the vehicle. When the OTA master downloads update data from the center by OTA, the OTA master notifies a user that there is the update data by displaying the notification on a display device in the vehicle. When the OTA master receives acceptance from the user through an operation on an input device such as a button, the OTA master installs and activates the update data.

SUMMARY

When the electronic control unit is replaced due to malfunction or the like, the version of the software installed in the electronic control unit may change before and after the replacement. When the software version changes through the replacement of the electronic control unit, persons involved in the replacement work (operator, user, or the like) can recognize that the version has changed due to other than the software update by the OTA. When the software version is changed due to unauthorized rewriting of the software, however, there is a possibility that the user, the vehicle, or the like cannot recognize that the version has changed due to other than the software update by the OTA.

The present disclosure provides, a center, a distribution control method, and non-transitory storage medium that can recognize that a software version has changed due to other than a software update by OTA even if the version is changed due to unauthorized rewriting of the software.

A first aspect of the present disclosure relates to a center configured to communicate with a vehicle. The center includes one or more processors. The one or more processors are configured to store an update record of software of an electronic control unit mounted on the vehicle. The one or more processors are configured to receive a current version of the software of the electronic control unit from the vehicle. The one or more processors are configured to determine whether the received current version agrees with a version of a last update recorded in the update record. The one or more processors are configured to transmit an error notification to the vehicle when the one or more processors determine that the received current version does not agree with the version of the last update.

In the center according to the first aspect of the present disclosure, the one or more processors may be configured to disable update data distribution to the vehicle when the one or more processors determine that the received current version does not agree with the version of the last update.

In the center according to the first aspect of the present disclosure, the one or more processors may be configured to inquire of a terminal or a second center different from the center whether the version of the software of the electronic control unit has been changed when the one or more processors determine that the received current version does not agree with the version of the last update.

In the center according to the first aspect of the present disclosure, the one or more processors may be configured to disable the update data distribution to the vehicle when the one or more processors receive, from the terminal or the second center, a notification indicating that the version of the software of the electronic control unit has not been changed.

In the center according to the first aspect of the present disclosure, the one or more processors may be configured to, when the current version received by the one or more processors contains a defect, distribute update data for eliminating the defect without disabling the update data distribution to the vehicle.

In the center according to the first aspect of the present disclosure, the one or more processors may be configured to receive an instruction to terminate a disabled state of the update data distribution. The one or more processors may be configured to enable the update data distribution to the vehicle when the one or more processors receive the instruction.

A second aspect of the present disclosure relates to a distribution control method for software update data to be executed by a computer of a center including one or more processors, a memory, and a storage device. The center is configured to communicate with a vehicle. The distribution control method includes storing an update record of software of an electronic control unit mounted on the vehicle, receiving a current version of the software of the electronic control unit from the vehicle, determining whether the received current version agrees with a version of a last update recorded in the update record, and transmitting an error notification to the vehicle when determination is made that the received current version does not agree with the version of the last update.

A third aspect of the present disclosure relates to a non-transitory storage medium storing instructions that are executable by a computer of a center and that cause the computer to perform functions. The center includes one or more processors, a memory, and a storage device. The center is configured to communicate with a vehicle. The functions include storing an update record of software of an electronic control unit mounted on the vehicle, receiving a current version of the software of the electronic control unit from the vehicle, determining whether the received current version agrees with a version of a last update recorded in the update record, and transmitting an error notification to the vehicle when determination is made that the received current version does not agree with the version of the last update.

With the center and the like according to the present disclosure, it is possible to recognize that the software version has changed due to other than the software update by the OTA even if the version is changed due to the unauthorized rewriting of the software.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A center of the present disclosure transmits an error notification to a vehicle when a current software version of an electronic control unit that is received from the vehicle does not agree with a version of the last update in a software update record of the electronic control unit that is stored and managed by the center. Thus, it is possible to recognize that the software version has changed due to other than the software update by OTA in the vehicle even if the version is changed due to unauthorized rewriting of the software. An embodiment of the present disclosure will be described below in detail with reference to the drawings.

Embodiment

System Configuration

Figure 1:
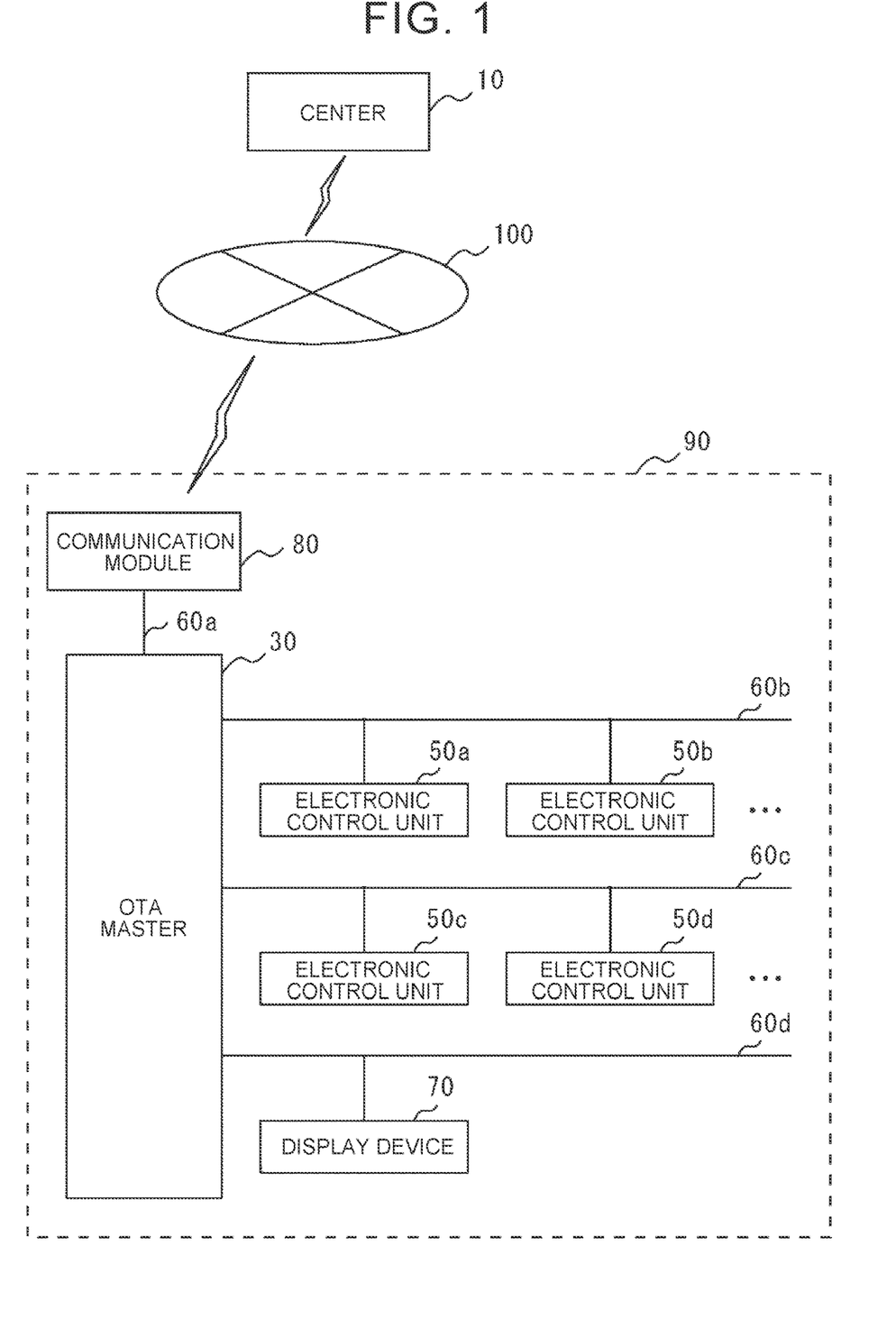
FIG. 1 is a block diagram illustrating an overall configuration of a network system according to an embodiment.

FIG. 1 is a block diagram illustrating an overall configuration of a network system according to the embodiment of the present disclosure. The network system illustrated in FIG. 1 is a system for updating software of a plurality of electronic control units (ECUs) 50a to 50d mounted on a vehicle. The network system includes a center 10 outside the vehicle, an in-vehicle network 90 constructed inside the vehicle, and a network 100.

(1) Center

The center 10 is communicable, via the network 100, with an OTA master 30 described later in the in-vehicle network 90. The center 10 transmits update data of the electronic control units 50a to 50d and receives a notification about progress of a software update process, thereby managing software update of the electronic control units 50a to 50d connected to the OTA master 30. The center 10 has functions of a so-called server.

Figure 2:
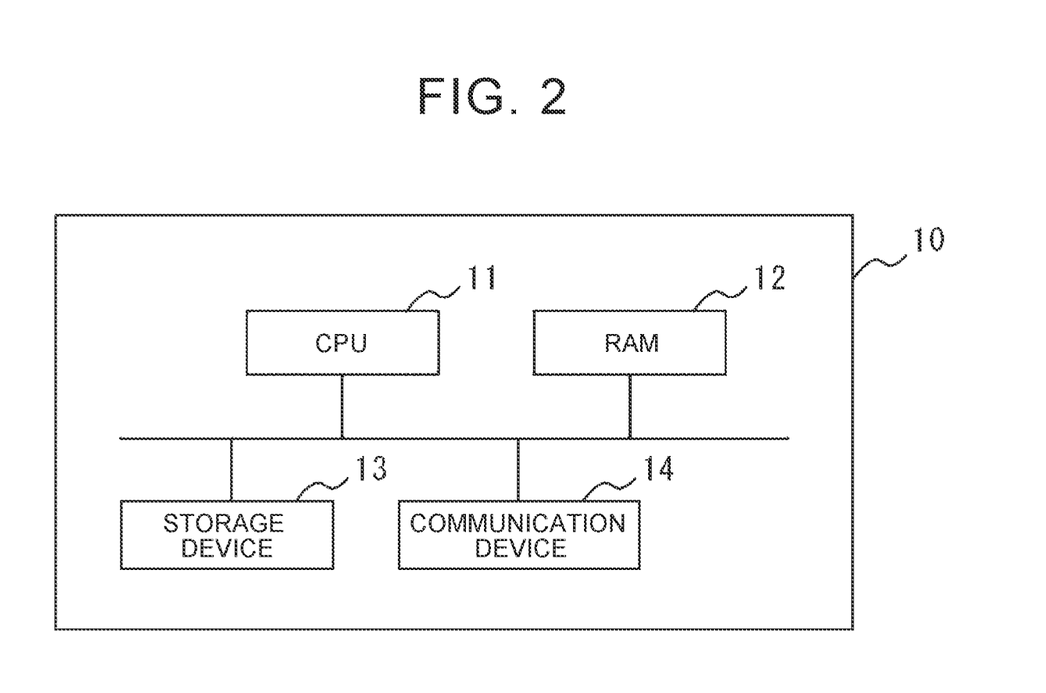
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a random-access memory (RAM) 12, a storage device 13, and a communication device 14. The storage device 13 includes a readable/writable storage medium such as a hard disk drive (HDD) or a solid state drive (SSD). For example, the storage device 13 stores programs for executing software update management, information to be used for the software update management, and update data of each electronic control unit. In the center 10, the CPU 11 executes the program read from the storage device 13 by using the RAM 12 as a work area to execute a predetermined process related to software update. The communication device 14 communicates with the OTA master 30 via the network 100.

Figure 3:
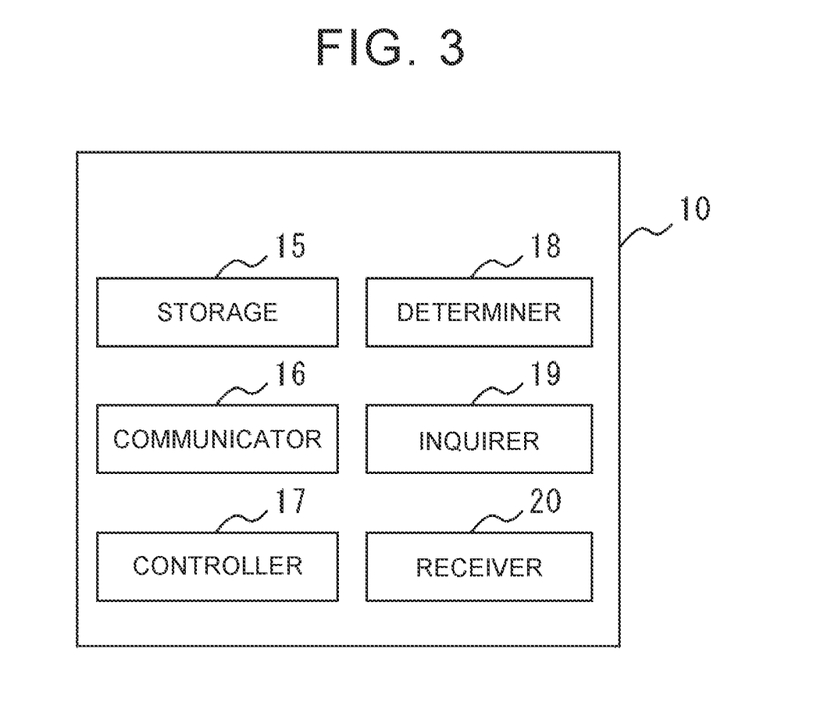
FIG. 3 is a functional block diagram of the center.

FIG. 3 is a functional block diagram of the center 10 illustrated in FIG. 2. The center 10 illustrated in FIG. 3 includes a storage 15, a communicator 16, a controller 17, a determiner 18, an inquirer 19, and a receiver 20. The storage 15 is implemented by the storage device 13 illustrated in FIG. 2. The communicator 16, the controller 17, the determiner 18, the inquirer 19, and the receiver 20 are implemented by the CPU 11 illustrated in FIG. 2 executing programs stored in the storage device 13 by using the RAM 12.

The storage 15 stores information related to the software update process of one or more electronic control units mounted on the vehicle. As the information related to the software update process, the storage 15 stores at least update management information and software update data of the electronic control units 50a to 50d. The update management information is information in which information indicating software available for the electronic control units 50a to 50d is associated with vehicle identification information (vehicle ID) for identifying the vehicle. Examples of the information indicating software available for the electronic control units 50a to 50d include a combination of latest versions of software products of the electronic control units 50a to 50d. As the information related to the software update process, the storage 15 also stores an update status that is a status of the software update being executed in the vehicle.

Figure 6:
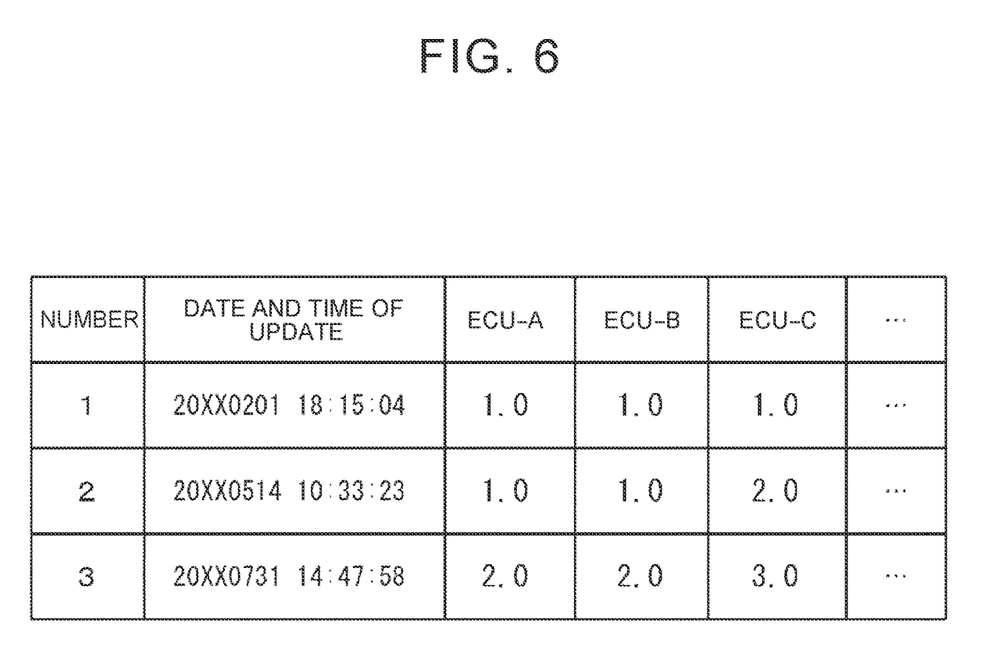
FIG. 6 illustrates an example of update record information stored in the center.

The storage 15 stores update record information indicating update records of the software of the electronic control units 50a to 50d mounted on the vehicle. The update record information is information in which contents of software update that has been executed on the vehicle are cumulatively recorded for each vehicle ID for identifying the vehicle. FIG. 6 illustrates an example of update record information in a vehicle with Vehicle ID_0001. The update record information exemplified in FIG. 6 is recorded in association with a number indicating a count of update executions, a date and time of update execution, and software versions of the electronic control units (ECUs) that have been changed through the update. For example, FIG. 6 demonstrates that the vehicle with Vehicle ID_0001 was subjected to a third update process at 14:47:58 on July 31, 20XX to update an electronic control unit ECU-A to Version 2.0, an electronic control unit ECU-B to Version 2.0, and an electronic control unit ECU-C to Version 3.0.

The communicator 16 transmits and receives data, information, requests, and the like to and from the OTA master 30. The communicator 16 is capable of receiving a software update check request from the OTA master 30 (receiver). For example, the update check request is information to be transmitted from the OTA master 30 to the center 10 when power supply or ignition is turned ON (hereinafter referred to as "powered ON") in the vehicle. The update check request is information for requesting the center 10 to check whether there is update data of the electronic control units 50a to 50d based on vehicle configuration information described later. In response to the update check request received from the OTA master 30, the communicator 16 transmits information indicating the presence or absence of update data to the OTA master 30 (transmitter). The communicator 16 transmits an error notification to the OTA master 30 when the determiner 18 described later determines that update data distribution by OTA is disabled (transmitter). The communicator 16 is also capable of receiving a distribution package transmission request (download request) from the OTA master 30 (receiver). In response to reception of the distribution package download request, the communicator 16 transmits, to the OTA master 30, a distribution package including the update data of the software of the electronic control units 50a to 50d that is generated by the controller 17 described later based on whether the update data distribution by the OTA is enabled or disabled and whether there is an instruction to terminate a disabled state (transmitter).

The determiner 18 acquires current versions of the software products of the electronic control units 50a to 50d from vehicle configuration information included in the update check request received by the communicator 16. Based on the update record information stored in the storage 15, the determiner 18 determines whether each current software version acquired from the vehicle agrees with the software version of the last update in the vehicle that is managed by the center 10 as an update record.

When the determiner 18 determines that each current software version does not agree with the software version of the last update, the inquirer 19 can inquire of a center (second center) different from the center 10 or a communication terminal of a dealer or a preregistered user whether the software versions of the electronic control units 50a to 50d have been changed.

The receiver 20 can receive an instruction to terminate the disabled state when the update data distribution by the OTA is disabled. For example, the instruction to terminate the disabled state is given from the dealer or the preregistered user when each current software version does not agree with the software version of the last update for a good reason such as replacement of the electronic control unit.

When the determiner 18 determines that each current software version agrees with the software version of the last update, the controller 17 enables the update data distribution by the OTA. When the determiner 18 determines that each current software version does not agree with the software version of the last update, the controller 17 disables the update data distribution by the OTA. A result of disabling the update data distribution by the OTA in the controller 17 is transmitted to the OTA master 30 by the communicator 16 in the form of an error notification. When the communicator 16 receives the update check request from the OTA master 30, the controller 17 determines whether there is software update data for the electronic control units 50a to 50d mounted on the vehicle identified by the vehicle ID included in the update check request based on the update management information stored in the storage 15. A result of the determination made by the controller 17 as to whether there is update data is transmitted to the OTA master 30 by the communicator 16. When determination is made that the update data distribution by the OTA is enabled and there is software update data for the electronic control units 50a to 50d, the controller 17 generates a distribution package including the corresponding update data stored in the storage 15 in response to reception of the distribution package download request from the OTA master 30.

(2) In-Vehicle Network

The in-vehicle network 90 includes the OTA master 30, the electronic control units 50a to 50d, a display device 70, and a communication module 80. The OTA master 30 and the communication module 80 are connected via a bus 60a. The OTA master 30 and the electronic control units 50a and 50b are connected via a bus 60b. The OTA master 30 and the electronic control units 50c and 50d are connected via a bus 60c. The OTA master 30 and the display device 70 are connected via a bus 60d.

The OTA master 30 can wirelessly communicate with the center 10 by the bus 60a and the communication module 80, via the network 100. The OTA master 30 can also communicate with the electronic control units 50a to 50d and the display device 70 by wire via the buses 60b to 60d. The OTA master 30 is a device having a function of managing an OTA status, controlling a software update sequence, and executing the software update of an electronic control unit to be updated (hereinafter referred to as "target electronic control unit"). The OTA master 30 controls the software update of the target electronic control unit among the electronic control units 50a to 50d based on, for example, the update data acquired from the center 10 through the communication. The OTA master 30 may also be referred to as "central gateway (CGW)". The one or more target electronic control units may function as the OTA master 30.

Figure 4:
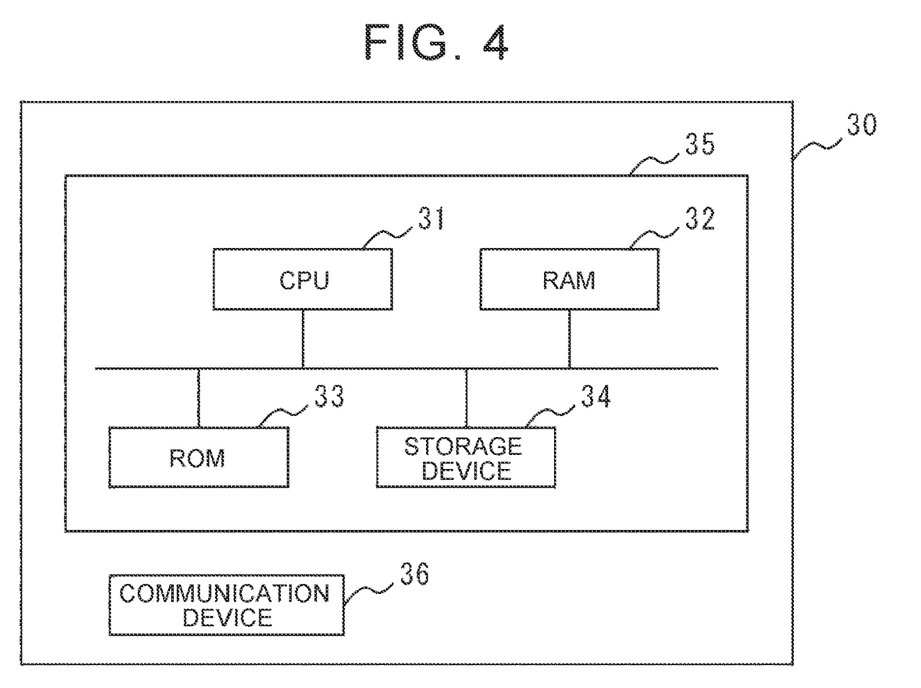
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes a CPU 31, a RAM 32, a read-only memory (ROM) 33, a storage device 34, and a communication device 36. The CPU 31, the RAM 32, the ROM 33, and the storage device 34 constitute a microcomputer 35. In the OTA master 30, the CPU 31 executes a program read from the ROM 33 by using the RAM 32 as a work area to execute a predetermined process related to software update. The communication device 36 communicates with the communication module 80, the electronic control units 50a to 50d, and the display device 70 via the buses 60a to 60d illustrated in FIG. 1.

Figure 5:
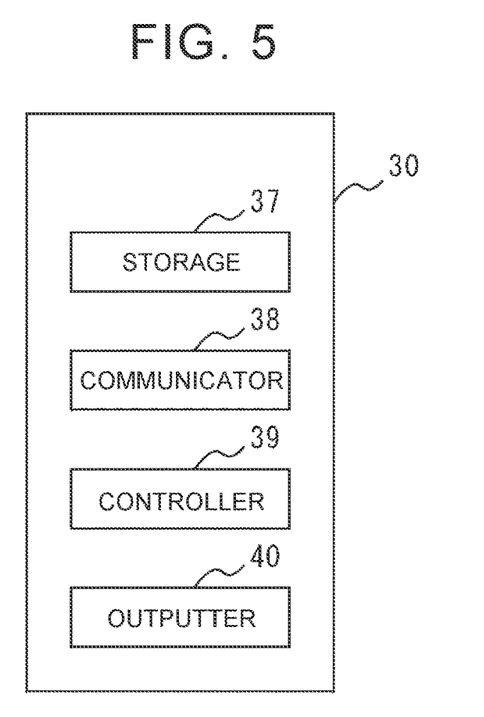
FIG. 5 is a functional block diagram of the OTA master.

FIG. 5 is a functional block diagram of the OTA master 30 illustrated in FIG. 4. The OTA master 30 illustrated in FIG. 5 includes a storage 37, a communicator 38, a controller 39, and an outputter 40. The storage 37 is implemented by the storage device 34 illustrated in FIG. 4. The communicator 38, the controller 39, and the outputter 40 are implemented by the CPU 31 illustrated in FIG. 4 executing programs stored in the ROM 33 by using the RAM 32.

The storage 37 stores a program for executing software update of the electronic control units 50*a* to 50*d* (control program for the OTA master 30), various types of data to be used when executing the software update, and software update data downloaded from the center 10.

The communicator 38 transmits and receives data, information, requests, and the like to and from the center 10. For example, the communicator 38 transmits a software update check request to the center 10 when the vehicle is powered ON. For example, the update check request includes the vehicle ID for identifying the vehicle, and information related to software versions of the electronic control units 50*a* to 50*d* connected to the in-vehicle network 90. The vehicle ID and the software versions of the electronic control units 50*a* to 50*d* are used to determine whether there is software update data for the electronic control units 50*a* to 50*d* and whether the update data distribution by the OTA is enabled or disabled when there is update data by making comparison with the software versions of the last (latest) update stored in the center 10 for each vehicle ID. The communicator 38 also receives a notification about the presence or absence of update data from the center 10 as a response to the update check request. The communicator 38 also receives an error notification when the update data distribution by the OTA is disabled. When there is software update data for the electronic control units 50*a* to 50*d*, the communicator 38 functions as a receiver configured to transmit a download request for a distribution package including the update data to the center 10 and receive (download) the distribution package transmitted from the center 10. The communicator 38 transmits, to the center 10, software update statuses transmitted by the electronic control units 50*a* to 50*d*.

The controller 39 determines whether there is software update data for the electronic control units 50*a* to 50*d* based on the error notification and the response to the update check request that are received from the center 10 by the communicator 38. The controller 39 also verifies authenticity of the distribution package received (downloaded) from the center 10 by the communicator 38 and stored in the storage 37. The controller 39 also controls the software update process (installation or activation) of the electronic control units 50*a* to 50*d* by using the update data received (downloaded) from the center 10. Specifically, the controller 39 transfers one or more pieces of update data downloaded in the distribution package to the target electronic control unit, and causes the target electronic control unit to install update software based on the update data. After the installation is completed, the controller 39 instructs the target electronic control unit to activate, that is, enable the installed update software.

When the communicator 38 receives the error notification from the center 10, the outputter 40 can output an instruction to display the error on the display device 70. By displaying the error via the display device 70, the user or the like can be informed, for example, that the software update process cannot be performed because the update data distribution by the OTA from the center 10 to the vehicle is disabled.

The electronic control units 50*a* to 50*d* are devices (ECUs) configured to control operations of individual parts of the vehicle. Although the four electronic control units 50*a* to 50*d* are exemplified in FIG. 1, the number of electronic control units is not particularly limited. The number of buses connecting the electronic control units to the OTA master 30 is not particularly limited as well.

The display device 70 is a human-machine interface (HMI) to be used for various types of display such as display of information indicating that there is update data during the software update process of the electronic control units 50*a* to 50*d*, display of information indicating that the software update process cannot be performed because the update data distribution by the OTA is disabled, display of an acceptance request screen for requesting acceptance of the user or administrator of the vehicle for the software update, and display of a result of the software update. A typical example of the display device 70 is a display device of a car navigation system. The display device 70 is not particularly limited as long as the display device 70 can display information necessary for the program update process. An electronic control unit or the like may further be connected to the bus 60*d* illustrated in FIG. 1 in addition to the display device 70.

The communication module 80 is a unit having a function of controlling communication between the center 10 and the vehicle, and is a communication device for connecting the in-vehicle network 90 to the center 10. The communication module 80 is wirelessly connected to the center 10 via the network 100 so that the OTA master 30 authenticates the vehicle and downloads update data. The communication module 80 may be included in the OTA master 30.

Overview of Software Update Process

For example, the OTA master 30 transmits a software update check request to the center 10 when the vehicle is powered ON. The update check request includes the vehicle ID for identifying the vehicle, and vehicle configuration information. The vehicle configuration information is information related to conditions of the electronic control units (system configuration), such as hardware and software versions of the electronic control units 50*a* to 50*d* connected to the in-vehicle network 90. The vehicle configuration information can be generated by acquiring identification numbers of the electronic control units (ECU_IDs) and identification numbers of the software versions of the electronic control units (ECU_Software_IDs) from the electronic control units 50*a* to 50*d* connected to the in-vehicle network 90. The vehicle ID and the software versions of the electronic control units 50*a* to 50*d* are used for comparison with the latest software versions held in the center 10 for each vehicle ID. A comparison result is used to determine whether there is software update data for the electronic control units 50*a* to 50*d* and whether the update data distribution by the OTA is enabled or disabled when there is update data. The OTA master 30 receives a notification indicating the presence or absence of update data from the center 10 as a response to the update check request. The OTA master 30 receives an error notification from the center 10 when the update data distribution by the OTA is disabled. When there is software update data for the electronic control units 50*a* to 50*d*, the OTA master 30 transmits a distribution package download request to the center 10, and receives a distribution package transmitted from the center 10. The distribution package may include, in addition to the update data, verification data for verifying the authenticity of the update data, the number of pieces of the update data, the order of installation, the order of activation, type information, and various types of control information to be used during software update.

The OTA master 30 determines whether there is software update data for the electronic control units 50*a* to 50*d* based on the error notification and the response, from the center 10, to the update check request that are received. The OTA master 30 verifies the authenticity of the distribution package received from the center 10 and stored in the storage device 34. The OTA master 30 transfers one or more pieces of update data downloaded in the distribution package to the target electronic control unit, and causes the target electronic control unit to install the update data. After the installation is completed, the OTA master 30 instructs the target electronic control unit to enable the installed updated version of software.

In an acceptance request process, the OTA master 30 causes an output device to output a notification that acceptance is required for software update, and a notification that prompts the user to input acceptance for the software update. Examples of the output device include the display device 70 provided in the in-vehicle network 90 and an audio output device that provides notifications by voice or sound. For example, when the display device 70 is used as the output device in the acceptance request process, the OTA master 30 is capable of causing the display device 70 to display an acceptance request screen for requesting acceptance for the software update, and causing the display device 70 to display a notification that prompts the user or administrator to perform a specific input operation such as pressing of an acceptance button when the user or administrator accepts the software update. In the acceptance request process, the OTA master 30 is capable of causing the display device 70 to display texts, icons, or the like for notifying that there is software update data for the electronic control units 50a to 50d, and causing the display device 70 to display restrictions during the execution of the software update process. In response to reception of the input of acceptance from the user or administrator, the OTA master 30 executes a control process for the installation and activation to update the software of the target electronic control unit.

When a non-volatile memory of the electronic control unit is a single-bank memory having one storage area for storing the program, the installation and activation are executed in succession. Therefore, the acceptance request process for the software update is executed before the installation. When the non-volatile memory of the electronic control unit is a dual-bank memory having two storage areas for storing the program, the acceptance request process for the software update is executed at least after the installation and before the activation. When the non-volatile memory of the electronic control unit is the dual bank memory, the acceptance request process for the software update may be executed before the installation or omitted.

The software update process includes a download phase, an installation phase, and an activation phase. The download phase is a phase in which the OTA master 30 downloads update data from the center 10. The installation phase is a phase in which the OTA master 30 transfers the downloaded update data to the target electronic control unit and installs the update data in the storage area of the target electronic control unit. The activation phase is a phase in which the target electronic control unit enables the installed updated version of software.

Download is a process in which the OTA master 30 receives the update data for updating the software of the electronic control units 50a to 50d that is transmitted from the center 10 in the form of the distribution package and stores the update data in the storage device 34. The download phase includes not only the execution of download, but also control of a series of processes related to the download, such as determination of whether the download can be executed, request for acceptance of the user or administrator of the vehicle for the download, and verification of the updated data.

The update data transmitted from the center 10 to the OTA master 30 may include update software for the electronic control units 50a to 50d, compressed data of the update software, or divided data of the update software or the compressed data. The update data may include an ECU_ID (or serial number) of the target electronic control unit and an ECU_Software_ID of the electronic control unit before update. The update data is downloaded as the distribution package. The distribution package includes update data for one or more electronic control units.

Installation is a process in which the OTA master 30 writes the update software (updated version program) to the target electronic control unit based on the update data downloaded from the center 10. The installation phase includes not only the execution of installation, but also control of a series of processes related to the installation, such as determination of whether the installation can be executed, request for acceptance of the user or administrator of the vehicle for the installation, transfer of the update data, and verification of the update software.

When the update data includes the update software, the OTA master 30 transfers the update data (update software) to the target electronic control unit in the installation phase. When the update data includes compressed data, difference data, or divided data of the update software, the OTA master 30 may transfer the update data to the target electronic control unit, and the target electronic control unit may generate the update software from the update data. The OTA master 30 may generate the update software from the update data and then transfer the update software to the target electronic control unit. The update software can be generated by decompressing the compressed data or assembling (integrating) the difference data or the divided data.

The update software can be installed by the target electronic control unit based on an installation request (or instruction) from the OTA master 30 (or the center 10). Alternatively, the target electronic control unit that has received the update data may autonomously execute the installation without receiving an explicit instruction from the OTA master 30.

Activation is a process in which the target electronic control unit enables (activates) the installed update software. The activation phase includes not only the execution of activation, but also a series of controls related to the activation, such as determination of whether the activation can be executed, request for acceptance of the user or administrator of the vehicle for the activation, and verification of an execution result.

The update software can be activated by the target electronic control unit based on an activation request (or instruction) from the OTA master 30 (or the center 10). Alternatively, the target electronic control unit that has received the update data may autonomously execute the activation after completion of the installation without receiving an explicit instruction from the OTA master 30.

The software update process can be executed successively or in parallel for the electronic control units.

The "software update process" herein includes not only a process of successively executing all of the download, installation, and activation, but also a process of executing only a part of the download, installation, and activation.

Processes

Next, processes to be executed in the network system according to the present embodiment will be described with reference to FIGS. 7 to 10 as well.

Figure 7:
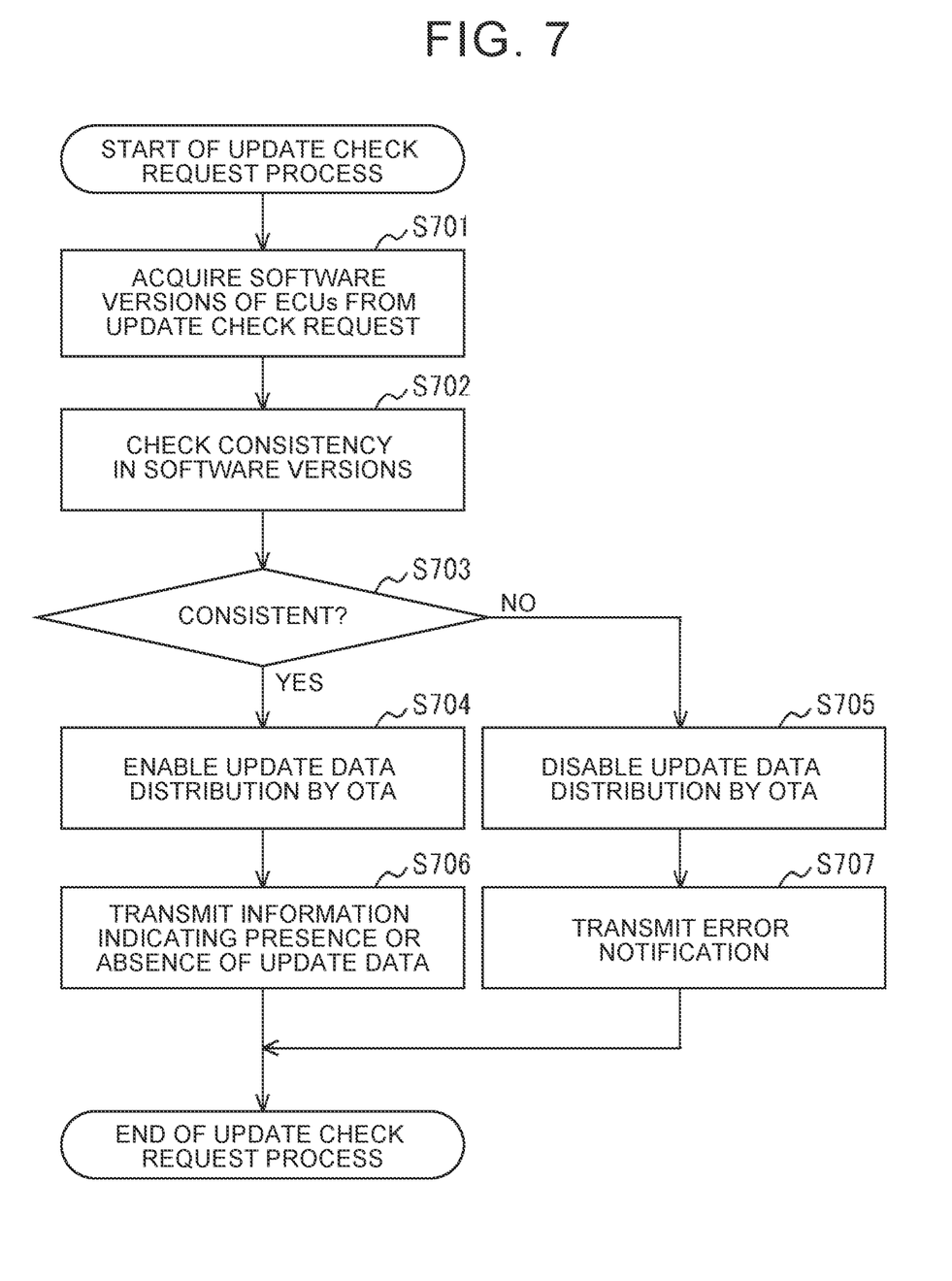
FIG. 7 is a flowchart of an update check request process to be executed by the center.

FIG. 7 is a flowchart illustrating a procedure of an update check request process to be executed by the components of the center 10. The update check request process illustrated in FIG. 7 is started when the center 10 receives an update check request transmitted by the OTA master 30.

Step S701

The determiner 18 acquires current versions of the software products of the electronic control units 50a to 50d mounted on the vehicle based on the update check request received from the OTA master 30 by the communicator 16. When the current software versions are acquired, the process proceeds to Step S702.

Step S702

The determiner 18 checks consistency in the software versions. The consistency is checked by determining whether each current software version acquired from the vehicle agrees with the software version of the last update in the vehicle that is stored as update record information in the storage 15 of the center 10. When the consistency is checked, the process proceeds to Step S703.

Step S703

As a result of checking the consistency, the determiner 18 determines whether the software versions of the electronic control units 50a to 50d are consistent or not. The determiner 18 determines that each current software version is consistent when the current software version agrees with the version of the last update. The determiner 18 determines that each current software version is not consistent when the current software version does not agree with the version of the last update. When the determiner 18 determines that the current software version is consistent (YES in Step S703), the process proceeds to Step S704. When the determiner 18 determines that the current software version is not consistent (NO in Step S703), the process proceeds to Step S705.

Step S704

Since each software version is consistent, the controller 17 enables the update data distribution by the OTA. When the update data distribution by the OTA is enabled, the process proceeds to Step S706.

Step S705

Since each software version is not consistent, the controller 17 disables the update data distribution by the OTA. When the update data distribution by the OTA is disabled, the process proceeds to Step S707.

Figure 8A:
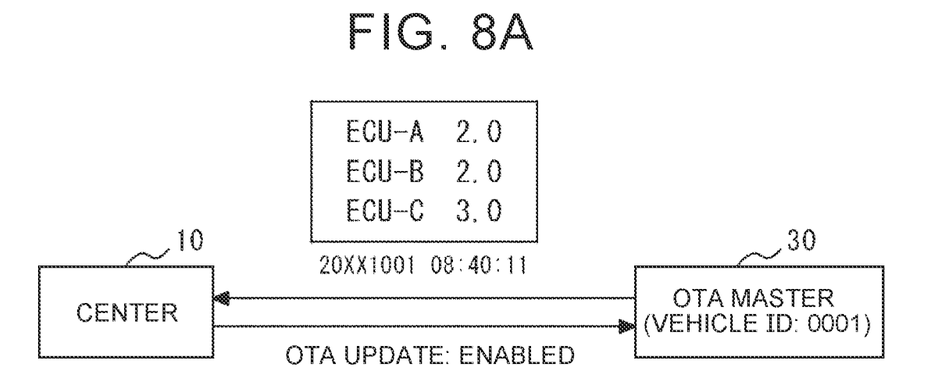
FIG. 8A is a diagram illustrating consistency in software versions.
Figure 8B:
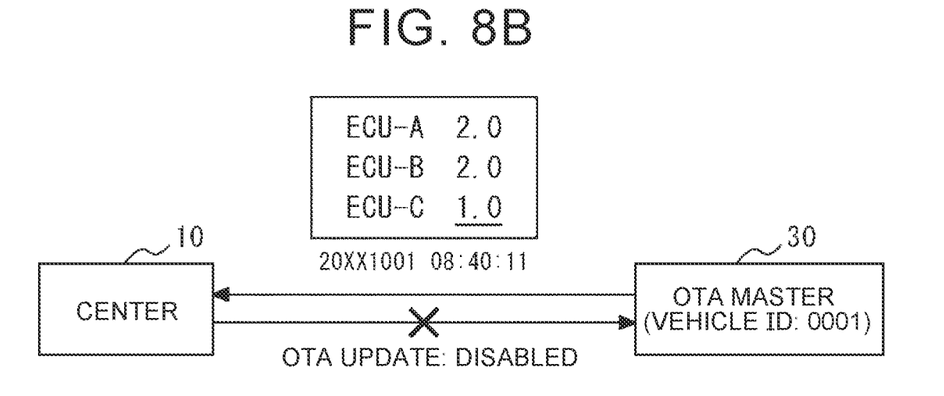
FIG. 8B is a diagram illustrating the consistency in the software versions.
Figure 8C:
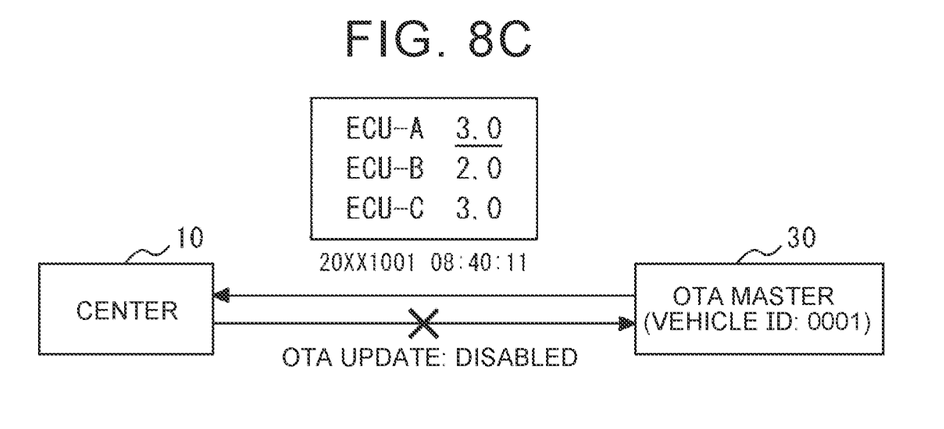
FIG. 8C is a diagram illustrating the consistency in the software versions.

The consistency in the software versions will be described with reference to FIGS. 8A to 8C. FIGS. 8A to 8C illustrate an example in which current software versions of the electronic control units ECU-A, ECU-B, and ECU-C are transmitted from the OTA master 30 to the center 10 in a case where the storage 15 of the center 10 stores the update record information illustrated in FIG. 6. In FIG. 8A, current versions "ECU-A: 2.0, ECU-B: 2.0, ECU-C: 3.0" agree with versions of the last update (versions of No. 3 in FIG. 6). Therefore, the update data distribution by the OTA is enabled. In FIG. 8B, the version of ECU-C among current versions "ECU-A: 2.0, ECU-B: 2.0, ECU-C: 1.0" is older than the version of the last update (version of No. 3 in FIG. 6) and does not agree with the version of the last update. Therefore, the update data distribution by the OTA is disabled. In FIG. 8C, the version of ECU-A among current versions "ECU-A: 3.0, ECU-B: 2.0, ECU-C: 3.0" is newer than the version of the last update (version of No. 3 in FIG. 6) and does not agree with the version of the last update. Therefore, the update data distribution by the OTA is disabled.

Step S706

The controller 17 determines whether there is software update data for the electronic control units 50a to 50d mounted on the vehicle identified by the vehicle ID included in the update check request based on the update management information stored in the storage 15. Based on a determination result, the controller 17 transmits information indicating the presence or absence of update data to the OTA master 30. When the information indicating the presence or absence of update data is transmitted, the update check request process is terminated.

Step S707

The communicator 16 transmits, to the OTA master 30, an error notification indicating that the update data distribution has been disabled. When the error notification is transmitted, the update check request process is terminated. Even when the error notification is transmitted, the information indicating the presence or absence of update data may be transmitted to the OTA master 30 same as in Step S706.

The embodiment described above is directed to the example in which, when determination is made in Step S703 that each software version is not consistent, the center 10 disables the update data distribution by the OTA and transmits the error notification to the OTA master 30 (Steps S705 and S707). When determination can be made that the current software version received from the vehicle contains a defect, the center 10 may distribute, to the OTA master 30, update data necessary to eliminate this defect without disabling the update data distribution by the OTA.

Figure 9:
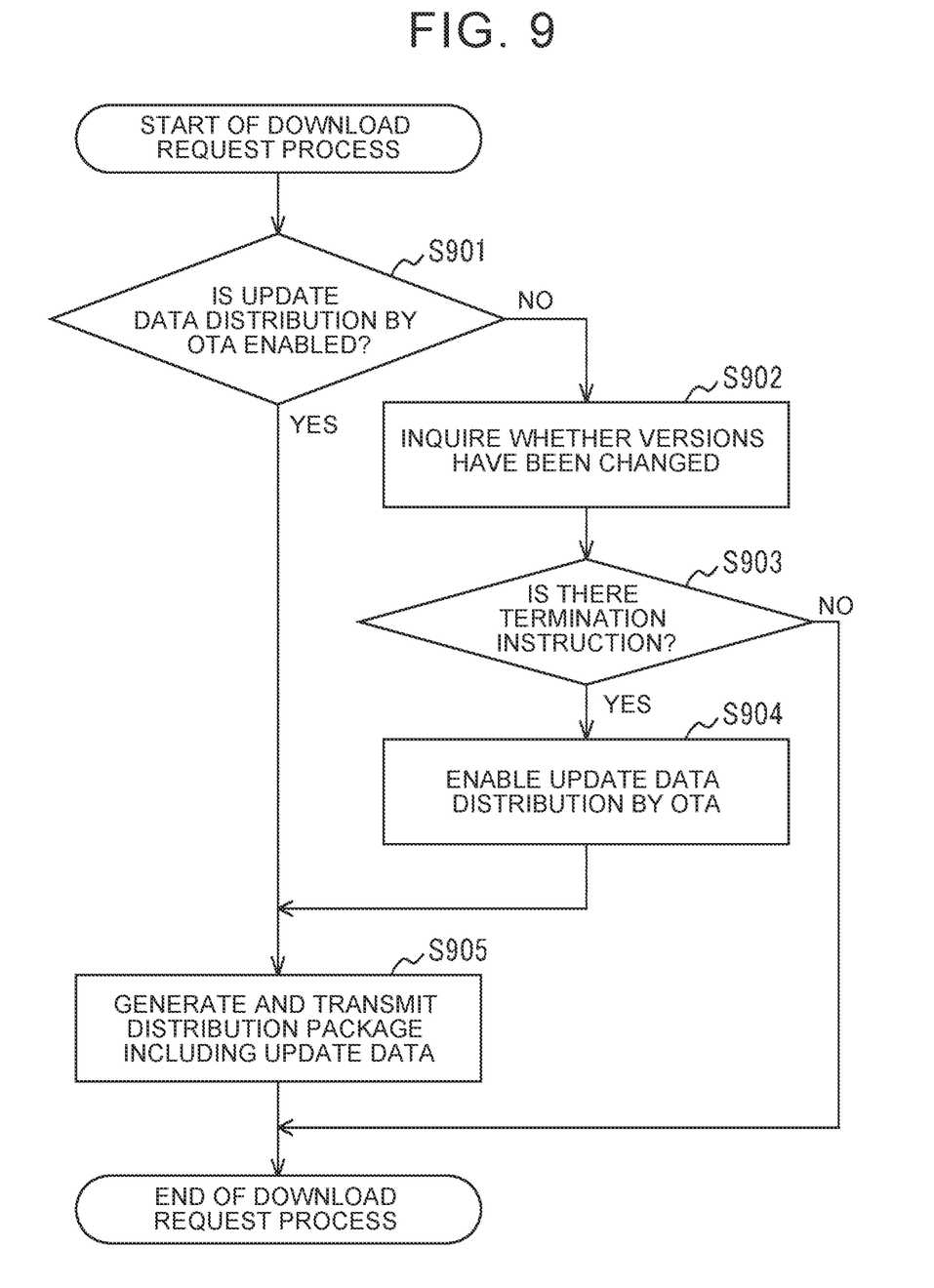
FIG. 9 is a flowchart of a download request process to be executed by the center.

FIG. 9 is a flowchart illustrating a procedure of a download request process to be executed by the components of the center 10. The download request process illustrated in FIG. 9 is started when the center 10 receives a distribution package download request transmitted by the OTA master 30.

Step S901

The controller 17 determines whether the update data distribution by the OTA is enabled. When the update data distribution by the OTA is enabled (YES in Step S901), the process proceeds to Step S905. When the update data distribution by the OTA is disabled (NO in Step S901), the process proceeds to Step S902.

Step S902

The inquirer 19 inquires of the center (second center) different from the center 10 or the communication terminal owned by the dealer or the user in advance whether the software versions of the electronic control units 50a to 50d have been changed. When the inquiry is made, the process proceeds to Step S903.

Step S903

The receiver 20 determines whether an instruction to terminate the disabled state of the update data distribution by the OTA has been received. As an example of the instruction to terminate the disabled state, a one-time password issued by the center 10 is transmitted to the communication terminal of the dealer or the user or a mobile terminal registered as a vehicle key, and the dealer or the user returns (inputs) the one-time password via the web. In addition, the following methods are conceivable. The user is authenticated in a predetermined service office (vehicle manufacturer (OEM) service office or the like) by telephone, and then the service office gives the termination instruction to the center 10. Alternatively, a dealer system in which a schedule of vehicle entry to the dealer has been confirmed cooperates with the center 10, and the termination instruction is given by pre-notifying the center 10 about dealer work. When the instruction to terminate the disabled state is received (YES in Step S903), the process proceeds to Step S904. When the instruction to terminate the disabled state is not received (NO in Step S903), the download request process is terminated.

Step S904

Since the controller 17 is instructed to terminate the disabled state of the update data distribution by the OTA, the controller 17 enables the update data distribution. When the update data distribution by the OTA is enabled, the process proceeds to Step S905.

Step S905

The controller 17 generates a distribution package including software update data for the electronic control units 50a to 50d. The communicator 16 transmits the distribution package generated by the controller 17 to the OTA master 30. When the distribution package is generated and transmitted, the download request process is terminated.

Figure 10:
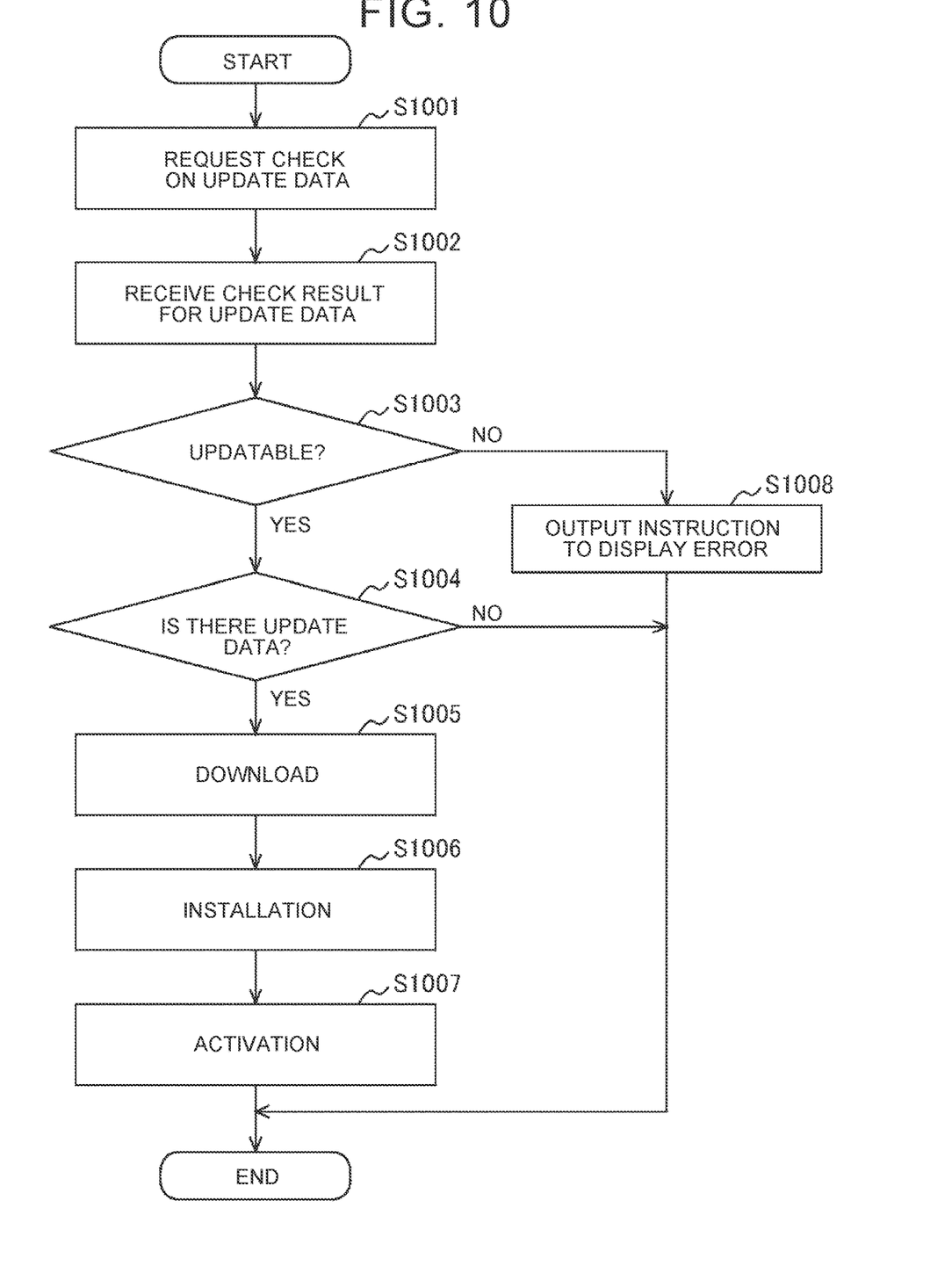
FIG. 10 is a flowchart of a software update control process to be executed by the OTA master.

FIG. 10 is a flowchart illustrating a procedure of a software update control process to be executed by the components of the OTA master 30. For example, the software update control process illustrated in FIG. 10 is executed when the vehicle is powered ON.

Step S1001

The communicator 38 transmits, to the center 10, a check request as to whether there is software update data for the electronic control units 50a to 50d. This check request includes the vehicle ID and current software versions of the electronic control units 50a to 50d. When the check request is transmitted to the center 10, the process proceeds to Step S1002.

Step S1002

The communicator 38 receives, from the center 10, a check result in response to the update data check request. When the check result is received, the process proceeds to Step S1003.

Step S1003

The controller 39 determines whether the software update can be executed. This determination can be made based on whether the communicator 38 has received, from the center 10, an error notification indicating that the update data distribution has been disabled. When the software update can be executed (YES in Step S1003), the process proceeds to Step S1004. When the software update cannot be executed (NO in Step S1003), the process proceeds to Step S1008.

Step S1004

The controller 39 determines whether there is software update data for at least one of the electronic control units 50a to 50d based on the check result in response to the update data check request that is received by the communicator 38. When there is at least one piece of software update data (YES in Step S1004), the process proceeds to Step S1005. When there is no software update data (NO in Step S1004), the software update control process is terminated.

Step S1005

The controller 39 downloads the update data. More specifically, the communicator 38 transmits a distribution package download request to the center 10. The communicator 38 receives a distribution package transmitted from the center 10 in response to the download request. The communicator 38 stores the received distribution package in the storage 37. When the update data is downloaded, the process proceeds to Step S1006.

Step S1006

The controller 39 executes the installation process for the target electronic control unit. More specifically, the controller 39 transfers the update data in the distribution package to the target electronic control unit, and instructs the target electronic control unit to install the update data. The target electronic control unit writes the update data received from the OTA master 30 to the data storage area. When the installation process is executed, the process proceeds to Step S1007.

Step S1007

The controller 39 executes the activation process for the target electronic control unit. More specifically, the controller 39 instructs the target electronic control unit that has written the update data to the data storage area to activate the updated version of software. The target electronic control unit is restarted and executes the updated software when a specific input operation such as powering OFF is performed. When the activation process is executed, the software update control process is terminated.

Step S1008

The outputter 40 outputs an instruction to display an error on the display device 70 based on the error notification received from the center 10 by the communicator 38. When the error display instruction is given, the software update control process is terminated.

Effects

As described above, in the network system according to the embodiment of the present disclosure, the center 10 transmits the error notification to the vehicle when the current software versions of the electronic control units 50a to 50d that are received from the vehicle (OTA master 30) do not agree with the versions of the last update in the software update record information of the electronic control units 50a to 50d that is stored and managed by the center 10. With this notification, it is possible to recognize that the software versions have changed due to other than the software update by the OTA in the vehicle even if the versions are changed due to unauthorized rewriting of the software. By displaying the error on the display device 70 or the like based on the error notification, it is possible to notify the user or the like that the software update cannot be executed by the OTA.

When the current software versions of the electronic control units 50a to 50d do not agree with the versions of the last update in the update record information, the center 10 disables the update data distribution by the OTA. As a result, it is possible to suppress the update data distribution to the electronic control unit having unauthorized software.

When the current software versions of the electronic control units 50a to 50d do not agree with the versions of the last update in the update record information for a good reason, the center 10 can terminate the disabled state of the update data distribution by the OTA in response to the instruction from the user or the like. Thus, user's convenience is not impaired more than necessary.

When the current software versions of the electronic control units 50a to 50d do not agree with the versions of the last update in the update record information, the center 10 can inquire of the center (second center) different from the center 10 or the communication terminal of the dealer or the preregistered user whether the software versions of the electronic control units 50a to 50d have been changed. Thus, it is possible to check whether the software versions have changed due to unauthorized rewriting of the software.

The order of the error notification, the disabling of the update data distribution by the OTA, and the inquiry to the user or the like is not limited to that of the embodiment, and may be set arbitrarily.

Although the embodiment of the technology of the present disclosure has been described above, the present disclosure can be understood not only as the center but also as, for example, a distribution control method to be executed by a center including a processor, a memory, and a storage device, a distribution control program, or a non-transitory computer-readable storage medium storing the distribution control program. The center may include one or more processors.

The technology of the present disclosure can be used in a network system for updating software of an electronic control unit.

What is claimed is:

1. A center configured to communicate with a vehicle, the center comprising:
one or more processors configured to:
store an update record of software of an electronic control unit mounted on the vehicle;
receive a current version of the software of the electronic control unit from the vehicle;
determine whether the received current version agrees with a version of a last update recorded in the update record;
transmit an error notification to the vehicle when the one or more processors determine that the received current version does not agree with the version of the last update; and
disable update data distribution to the vehicle when the one or more processors determine that the received current version does not agree with the version of the last update.

2. The center according to claim 1, wherein the one or more processors are configured to inquire of a terminal or a second center different from the center whether the version of the software of the electronic control unit has been changed when the one or more processors determine that the received current version does not agree with the version of the last update.

3. The center according to claim 2, wherein the one or more processors are configured to disable the update data distribution to the vehicle when the one or more processors receive, from the terminal or the second center, a notification indicating that the version of the software of the electronic control unit has not been changed.

4. The center according to claim 1, wherein the one or more processors are configured to, when the current version received by the one or more processors contains a defect, distribute update data for eliminating the defect without disabling the update data distribution to the vehicle.

5. The center according to claim 1, wherein the one or more processors are configured to:
receive an instruction to terminate a disabled state of the update data distribution; and
enable the update data distribution to the vehicle when the one or more processors receive the instruction.

6. A distribution control method for software update data to be executed by a computer of a center including one or more processors, a memory, and a storage device, the center being configured to communicate with a vehicle, the distribution control method comprising:
storing an update record of software of an electronic control unit mounted on the vehicle;
receiving a current version of the software of the electronic control unit from the vehicle;
determining whether the received current version agrees with a version of a last update recorded in the update record;
transmitting an error notification to the vehicle when determination is made that the received current version does not agree with the version of the last update; and
disabling update data distribution to the vehicle when a determination is made that the received current version does not agree with the version of the last update.

7. A non-transitory storage medium storing instructions that are executable by a computer of a center and that cause the computer to perform functions, the center including one or more processors, a memory, and a storage device, the center being configured to communicate with a vehicle, the functions comprising:
storing an update record of software of an electronic control unit mounted on the vehicle;
receiving a current version of the software of the electronic control unit from the vehicle;
determining whether the received current version agrees with a version of a last update recorded in the update record;
transmitting an error notification to the vehicle when determination is made that the received current version does not agree with the version of the last update; and
disabling update data distribution to the vehicle when a determination is made that the received current version does not agree with the version of the last update.

* * * * *